United States Patent
Boals et al.

(10) Patent No.: US 11,958,603 B1
(45) Date of Patent: Apr. 16, 2024

(54) ANTENNA SYSTEM FOR UNMANNED AERIAL VEHICLES WITH PROPELLERS

(71) Applicants: Justin Boals, Santa Monica, CA (US); Ugur Olgun, Venice, CA (US); Ashutosh Y. Shukla, Playa Vista, CA (US)

(72) Inventors: Justin Boals, Santa Monica, CA (US); Ugur Olgun, Venice, CA (US); Ashutosh Y. Shukla, Playa Vista, CA (US)

(73) Assignee: Snap Inc., Santa Monica, CA (US)

(*) Notice: Subject to any disclaimer, the term of this patent is extended or adjusted under 35 U.S.C. 154(b) by 648 days.

(21) Appl. No.: 17/082,438

(22) Filed: Oct. 28, 2020

Related U.S. Application Data

(60) Provisional application No. 62/938,778, filed on Nov. 21, 2019.

(51) Int. Cl.
| | | |
|---|---|---|
| *B64C 39/02* | (2023.01) | |
| *B64U 10/13* | (2023.01) | |
| *B64U 101/30* | (2023.01) | |
| *H01Q 1/28* | (2006.01) | |
| *H01Q 1/48* | (2006.01) | |
| *H01Q 15/14* | (2006.01) | |

(52) U.S. Cl.
CPC ............ *B64C 39/024* (2013.01); *H01Q 1/28* (2013.01); *H01Q 1/48* (2013.01); *H01Q 15/14* (2013.01); *B64U 10/13* (2023.01); *B64U 2101/30* (2023.01); *B64U 2201/10* (2023.01)

(58) Field of Classification Search
CPC ........ H01Q 1/28; H01Q 15/14; B64C 39/024; B64U 2101/30; B64U 2201/10
See application file for complete search history.

(56) References Cited

U.S. PATENT DOCUMENTS

| | | | | |
|---|---|---|---|---|
| 3,389,393 | A * | 6/1968 | Young, Jr. ............... | H01Q 1/286 343/708 |
| 3,611,376 | A * | 10/1971 | Gutleber ............... | G01S 13/913 342/158 |
| 4,042,929 | A * | 8/1977 | Dorey ....................... | G01S 3/52 342/418 |
| 4,737,788 | A * | 4/1988 | Kennedy ................. | G01S 13/50 342/159 |
| 5,614,908 | A * | 3/1997 | Phelan ..................... | H01Q 1/28 343/705 |
| 5,745,081 | A * | 4/1998 | Brown ..................... | H01Q 1/28 343/705 |
| 6,054,947 | A * | 4/2000 | Kosowsky .......... | G01S 13/9082 342/191 |
| 7,701,384 | B2 * | 4/2010 | Becker .................. | G01S 13/935 343/705 |
| 7,728,756 | B2 * | 6/2010 | Krikorian ............. | G01S 7/4026 342/25 R |
| 8,957,816 | B2 * | 2/2015 | Imbert ................... | B64D 45/00 343/893 |
| 9,188,657 | B2 * | 11/2015 | Benson ..................... | G01S 5/06 |

(Continued)

*Primary Examiner* — Ricardo I Magallanes
(74) *Attorney, Agent, or Firm* — Culhane Meadows PLLC; Stephen J. Weed

(57) ABSTRACT

A UAV having a wireless-front end including propellers that are dual purposed to function as ground communication antenna elements. This design reduces weight and size of the UAV, hence enabling a compact design with the capability of handling a heavier payload.

16 Claims, 5 Drawing Sheets

(56) References Cited

U.S. PATENT DOCUMENTS

| | | | | |
|---|---|---|---|---|
| 10,644,384 B1* | 5/2020 | Ozdemir | ............... | H01Q 9/28 |
| 10,644,385 B1* | 5/2020 | Greenwood | ........... | H01Q 21/20 |
| 2010/0328169 A1* | 12/2010 | Collette | ................ | B64C 1/36 |
| | | | | 343/705 |
| 2013/0272875 A1* | 10/2013 | Sieber | ................ | F03D 80/00 |
| | | | | 416/1 |
| 2016/0233577 A1* | 8/2016 | Saakian | ............... | H01Q 1/282 |
| 2017/0025744 A1* | 1/2017 | Becze | ................ | H01Q 1/46 |
| 2018/0019516 A1* | 1/2018 | Teague | ............... | H01Q 3/08 |
| 2018/0097282 A1* | 4/2018 | Lee | ................ | H01Q 3/02 |
| 2018/0269587 A1* | 9/2018 | Jones | ................ | B64C 11/20 |
| 2018/0342787 A1* | 11/2018 | McAllister | ........... | H01Q 1/2216 |
| 2019/0173324 A1* | 6/2019 | Arnitz | ................ | H02J 50/402 |
| 2020/0108913 A1* | 4/2020 | Schiller | ............... | B64C 11/50 |
| 2021/0050911 A1* | 2/2021 | Stoufflet | .............. | H01Q 1/286 |
| 2021/0135345 A1* | 5/2021 | Wei | ................ | H01Q 1/28 |
| 2021/0341628 A1* | 11/2021 | Suzuki | ............... | G01S 19/36 |
| 2022/0013924 A1* | 1/2022 | Nilsson | ............... | H04B 7/0814 |
| 2022/0043465 A1* | 2/2022 | Vander Mey | .......... | B64U 10/11 |
| 2022/0069449 A1* | 3/2022 | Xue | ................ | H01Q 21/205 |
| 2022/0069876 A1* | 3/2022 | Xue | ................ | H04B 7/0617 |

* cited by examiner

ANTENNA SYSTEM FOR UNMANNED AERIAL VEHICLES WITH PROPELLERS

CROSS-REFERENCE TO RELATED APPLICATIONS

This application claims priority to U.S. Provisional Application Ser. No. 62/938,778 entitled ANTENNA SYSTEM FOR UNMANNED AERIAL VEHICLES WITH PROPELLERS, filed on Nov. 21, 2019, the contents of which are incorporated fully herein by reference.

TECHNICAL FIELD

The present disclosure generally relates to antennas.

BACKGROUND

Antennas, such as those used on unmanned aerial vehicles (UAVs), including drones, have various configurations, and associated weight.

BRIEF DESCRIPTION OF THE DRAWINGS

In the drawings, which are not necessarily drawn to scale, like numerals may describe similar components in different views. Like numerals having different letter suffixes may represent different instances of similar components. Some examples are illustrated by way of example, and not limitation, in the figures of the accompanying drawings in which.

DETAILED DESCRIPTION

Figure 1:
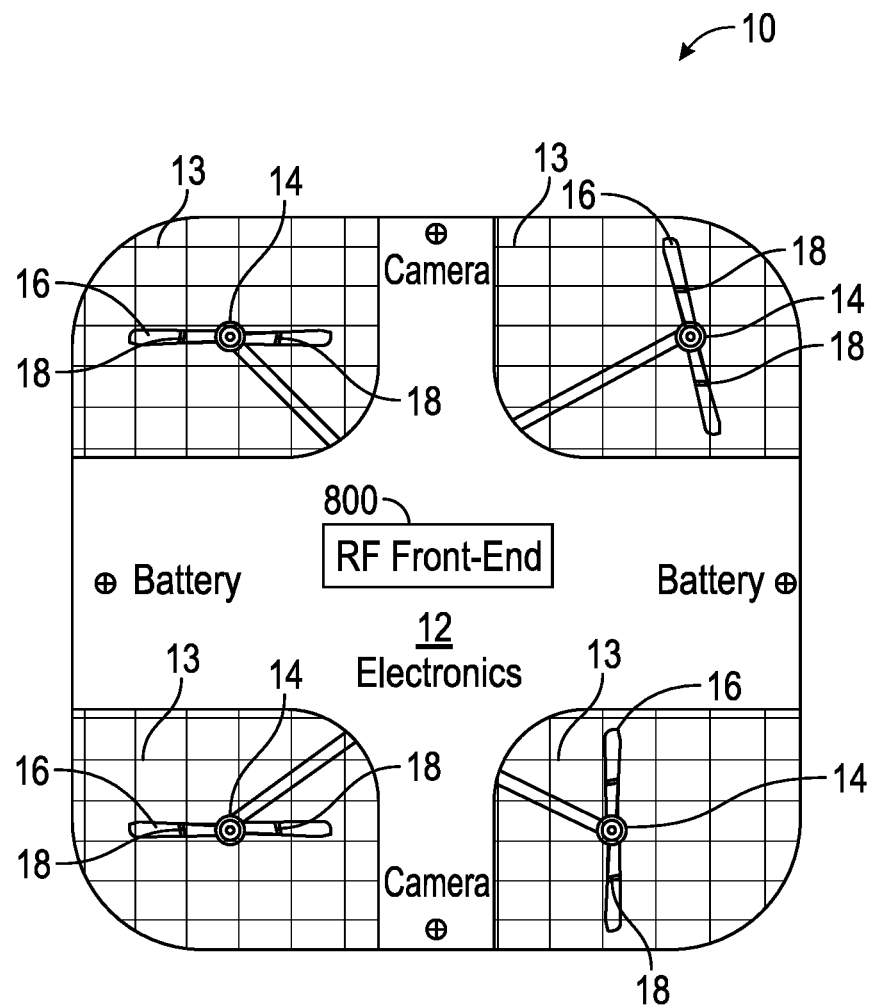
FIG. 1 illustrates a perspective view of a UAV with a planar mesh ground plane positioned over each of a plurality of propellers.

This disclosure provides a UAV having a wireless-front end including propellers that are dual purposed to function as ground communication antenna elements. This design reduces weight and size of the UAV, hence enabling a compact design with the capability of handling a heavier payload.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

The description that follows includes systems, methods, techniques, instruction sequences, and computing machine program products illustrative of examples of the disclosure. In the following description, for the purposes of explanation, numerous specific details are set forth in order to provide an understanding of various examples of the disclosed subject matter. It will be evident, however, to those skilled in the art, that examples of the disclosed subject matter may be practiced without these specific details. In general, well-known instruction instances, protocols, structures, and techniques are not necessarily shown in detail.

The terms and expressions used herein are understood to have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Reference now is made in detail to the examples illustrated in the accompanying drawings and discussed below.

Commercial unmanned aerial vehicles use various radio communication protocols for mission critical remote control and exchange of video and other data. These protocols typically include popular wireless systems such as GNSS and WiFi-WLAN. The wireless link with the ground equipment, such as a smartphone, is bidirectional and carries command & control (C&C) and telemetry data about the status of aircraft systems. Given the importance of this data to the safety of the equipment, the bidirectional wireless link quality needs to be very strong and reliable even under very challenging conditions. These conditions might include humidity, rain, multipath and fading.

An aspect of the quality of the wireless link between an unmanned aerial vehicle and the ground station is the antenna architecture they employ. Recognizing this, typically, UAVs are built with highly efficient multiple antenna systems to ensure reliable delivery of telemetry data. Highly efficient antennas require dedicated physical space and the number of antennas used in the design just multiplies that space requirement linearly. This is part of the reason as to why so many of the commercial UAVs in the market are bulky.

Another important consideration in the design of UAVs is the overall weight. Each dedicated antenna adds weight to the system and ideally the design would be better off without this added weight.

This disclosure provides a wireless front-end system in which the propellers of the UAV are dual purposed to function as ground communication antenna elements. This design eliminates the space and weight requirements of these antennas, hence enabling a compact design with the capability of handling a heavier payload.

Figure 2:
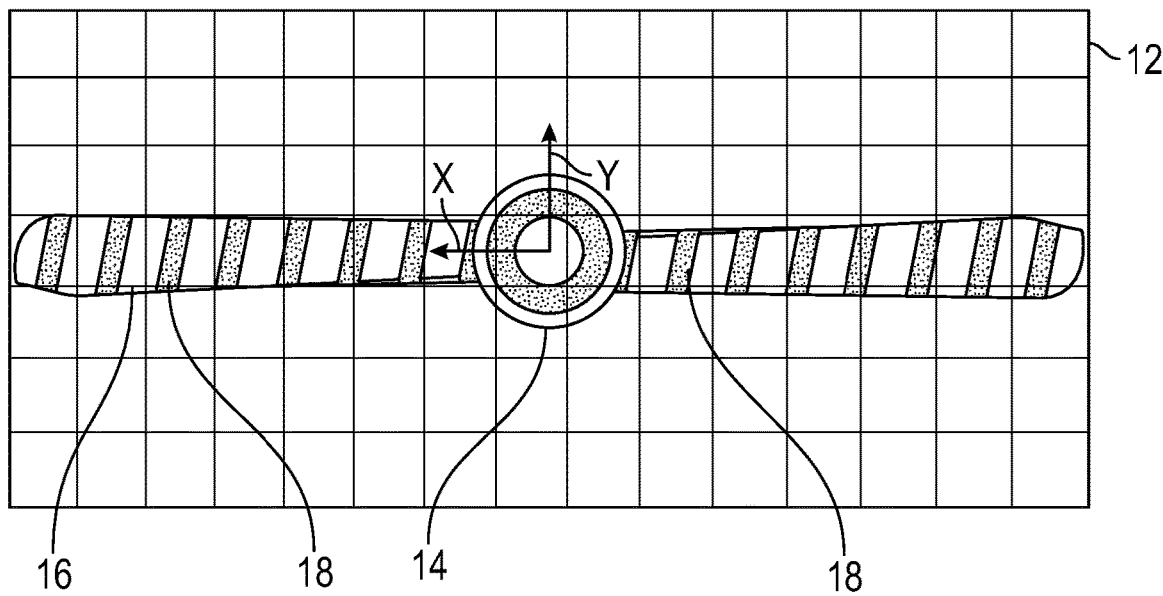
FIG. 2 illustrates a single ground mesh over one propeller.

FIG. 1 illustrates a perspective view of a UAV 10 with a generally planar ground plane 12 having a corner mesh portion 13 positioned over each of a plurality of propellers 14, where some or all of the blades 16 of each of the propellers 14 have an antenna 18. The ground plane 12 is optional, and may or may not be used depending on design choice. The ground plane 12 is secured to the UAV 10 by a support and extends parallel to the UAV 10 and over each of the blades 16. While a single ground plane 12 is shown, two or more ground planes can be used, such as one positioned over each of the propellers 14, such as shown in FIG. 2.

Figure 3:
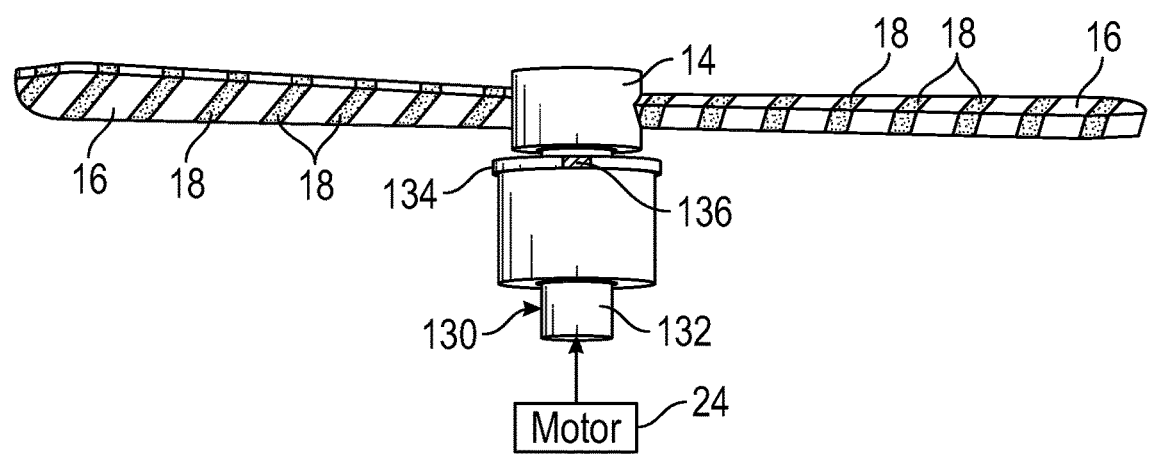
FIG. 3 illustrates a propeller where each blade includes one arm of an antenna.
Figure 8:
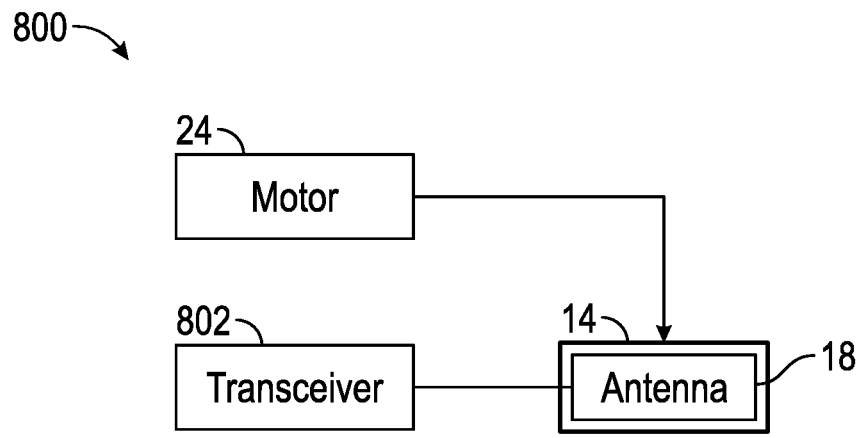
FIG. 8 illustrates a block diagram of a wireless front end of the UAV.

Referring to FIG. 3, propeller 14 includes an electrically non-conductive drive shaft 130 mechanically connected to and is driven by a motor 24 (FIGS. 3 and 8). A non-rotating, non-conductive sleeve tube 132 is mounted around the drive shaft 130 and acts as an antenna carrier. A conductive loop coupler structure 134 is attached to the antenna carrier 132 and creates the magnetic fields necessary to enable efficient radiation from the antenna element 18. The coupler structure 134 could be a single turn loop, or it could be a multiple turn helix mounted on the antenna carrier 132. The number of turns on the coupler element 132 plays a critical role in establishing resonant frequency of the antenna element 18 and its efficiency, so the choice of a loop or a multi-turn helix is part of the antenna design. This is due to the fact that the number of turns and the diameter of the coupler structure 134 impact the magnetic flux generated by the coupler structure 134 per Biot-Savart law, which in turn impacts how the antenna element 18 is excited. The coupler structure 134 physically connects to an RF front end to function. The propeller 14 magnetic coupling structure creates circularly symmetric H fields, which in turn excite the propeller antenna 18 without physical contact.

This connection is simplified in FIG. 3 as an antenna launch 136. This connection can be established with a twin lead or coaxial cable that terminates at the antenna launch 136. One end of the twin lead or the inner conductor of the coaxial cable is connected to one end of the coupler structure 134 and the other end of the twin lead or the outer conductor of the coaxial cable is connected to the other end of the coupler structure 134. The cable does not rotate as it is mounted on non-rotating antenna carrier 132 and the support arms of the UAV 10.

The propeller 14 including blades 16 can be made out of metal or non-conductive material. Typically, non-conductive materials, such as plastic, are used since they are lighter. If the propeller 14 including blades 16 are plastic, as an example, the antenna element 18 could be lasered via laser direct structuring (LDS) on top of the plastic propeller blades 16 as shown in FIG. 3. If blade 16 is metal, the blades them become the antenna.

Figure 4:
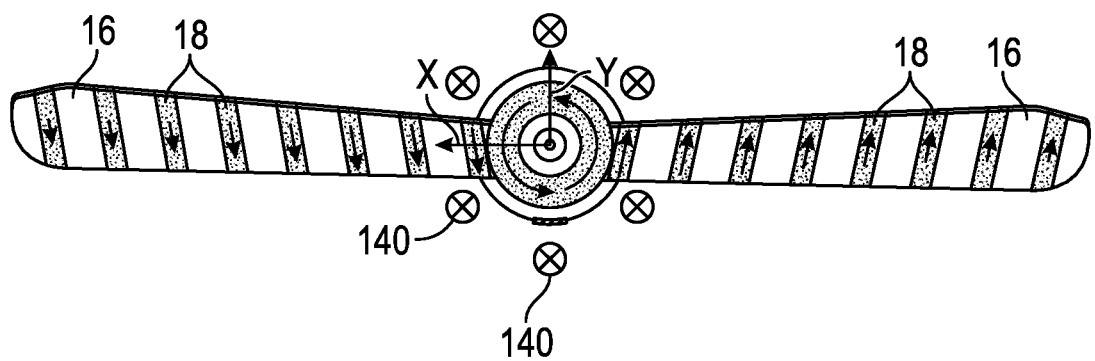
FIG. 4 illustrates a magnetic field, shown as vectors, generated by the current carried on the loop coupler below it.

FIG. 4 shows the magnetic field 140, shown as vectors, generated by the current carried (not shown) on the loop coupler 134 below it. This magnetic field 140 in turn generates a time-varying current, shown as arrows, on the propeller antenna element 18 as a direct consequence of Ampere's law. The current follows along the antenna pattern and gets weaker as it reaches to the tip of the blade 16. The current at the tip of the propeller blade 16 is zero as there is no more conductor and the system is essentially open circuited. Given this, note that the design of the pattern is of critical importance to the function of this antenna element 18.

Figure 5:
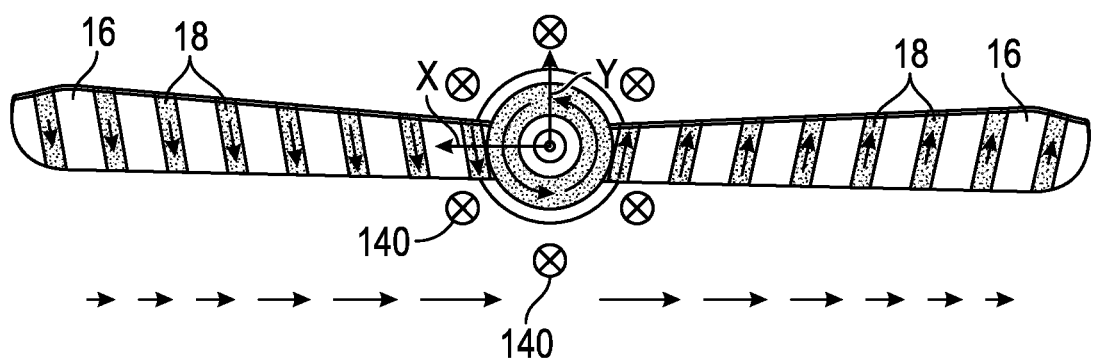
FIG. 5 illustrates the current vectors on the right side of the propeller and the current vectors on the left side of the propeller cancel each other in they axis but constructively add in the x axis.

As seen in FIG. 5, the current vectors on the right side of the propeller 14 and the current vectors on the left side of the propeller 14 cancel each other in the y axis but constructively add in the x axis, as shown in FIG. 5 by the underlying arrows pointing to the right. This results in a similar current distribution as would exist in on a dipole antenna for, example.

Figure 6:
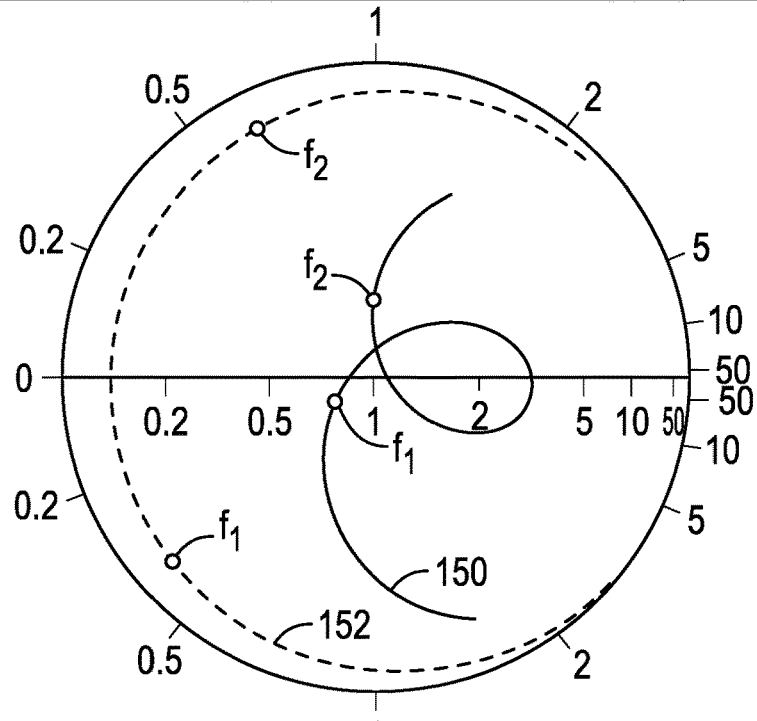
FIG. 6 illustrates the impedance seen at the antenna launch when the propeller antenna is in place, and when it is not in place, when everything else is held constant.

FIG. 6 depicts the impedance seen at the antenna launch when the propeller antenna 18 is in place at 150, and when it is not in place at 152, when everything else is held constant. As seen, the propeller antenna 18 is creating a radiating mode which results in significantly enhanced radiation system bandwidth and reduction in impedance matching losses, yielding to higher antenna system efficiency performance. This is due to the fact that the radiating currents shown in FIG. 5 are lined up constructively to create a radiating mode.

Figure 7:
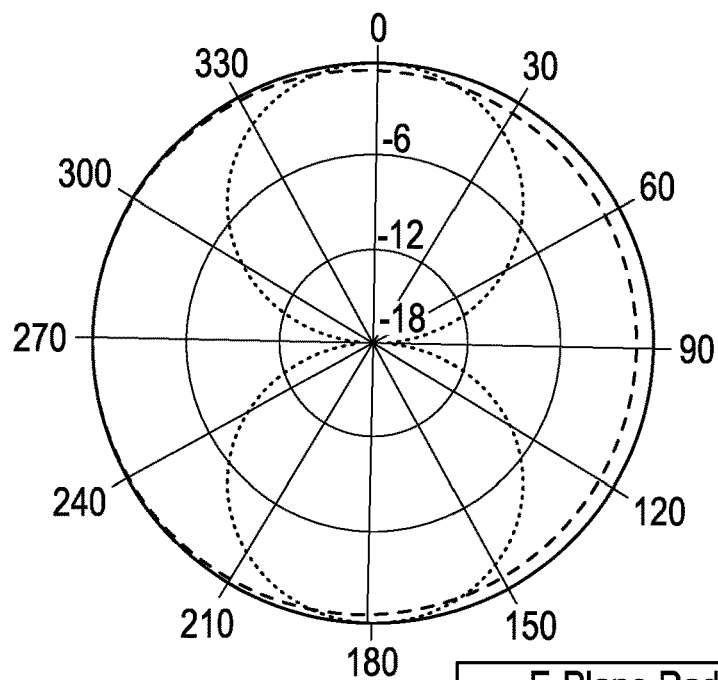
FIG. 7 illustrates the antenna architecture has a dipole like radiation pattern.

Overall, the current distribution shown in FIG. 5 looks very similar to what one would see with a center-fed dipole antenna. The lengths of the antenna elements 18 are also tuned similarly as it would have been in a dipole antenna to achieve the desired impedance behavior. In regards to the radiation pattern, for UAV 10 without the ground plane 12, this antenna architecture has a dipole like radiation pattern at the fundamental frequency, as shown in FIG. 7. All in all, the closest analogy to the antenna design disclosed is a horizontal wire dipole architecture. As a result of this behavior, there will be some radiated energy that is propagating towards the sky and some towards the Earth ground. In a typical horizontal dipole application, the desire is to maximize the "towards the sky" radiation. However, given that this antenna is mounted on a UAV, the desire is to maximize the "towards the ground" radiation for ground communication systems like Wifi and LTE. This can be done with the added metal mesh ground plane 12 on top of the propeller 14 that allows the air to pass through so there can be lift-off, but the mesh ground plane 12 also acts as a RF reflector so it guides the radiated energy towards the ground.

FIG. 8 illustrates a block diagram of a wireless front end 800 of the UAV 10 including a transceiver 802 configured to generate a data signal that is radiated by antenna(s) 18 on blade(s) 16 to create a wireless signal. The transceiver 802 is configured to bidirectionally communicate with another transceiver (not shown), such as a transceiver on the ground when the UAV is in the air. The antenna 18 can have many forms, and limitation to the disclosed examples is not to be inferred. The respective antenna is integrated to the respective blade to create a lightweight and compact UAV 10.

Figure 9:
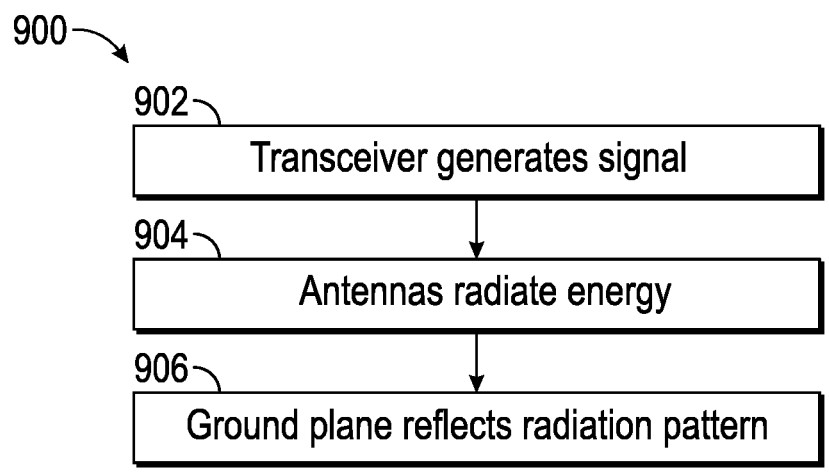
FIG. 9 illustrates a method of operating the antenna to create a downwardly projected radiation pattern.

FIG. 9 illustrates a method 900 of operating the antennas on the propellers of the UAV to create a downwardly directed radiation pattern.

At step 902, the transceiver 802 generates a data signal and communicates it to the antenna(s) 18. The data signal can be indicative of the UAV telemetry, functions, and other forms of data.

At step 904, the antennas 18 of each blade 16 of propeller 14 are energized by the data signal. The antennas 18 responsively radiate wireless energy, such as at a wireless frequency band.

At step 906, the ground plane 12 reflects the radiated energy to create a radiation pattern that is directed downwardly toward the ground. The radiation pattern may comprise the pattern shown in FIG. 7.

In addition, this antenna architecture is linearly polarized with very low cross-polarization performance. This is due to the fact that the propeller antenna 18 discussed herein closely resembles a horizontal dipole antenna. As such, when the propeller 14 is spinning, the polarization of the antenna element 18 will be changing as well. To leverage this property, one example is to include a second propeller antenna 18 to ensure that the propellers 14 are 90 degrees out of phase with each other at all times. This is easily achieved by adding encoders on the motors to continuously monitor the propeller angle, or it can be done at the factory by permanently syncing the motors to be 90 degrees out-of-phase of each other at all times. The benefit to be inherited orthogonal behavior is improved polarization coverage. If the antennas element 18 are also hooked to a multiple in multiple out (MIMO) RF front end system, then this antenna architecture adds the benefit of maximum throughput performance to the wireless communication. Both improved polarization diversity (which increases the range) and spectral diversity (increases the throughput) would be much welcome additions to any UAV system as it would elevate the end experience substantially.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

What is claimed is:

1. An unmanned aerial vehicle (UAV), comprising:
   a body;
   two propellers coupled to the body, wherein the two propellers each include at least one blade including an antenna, wherein the antennas are configured to transmit and receive a radiation pattern, wherein the propellers are 90 degrees out of phase with each other; and
   a ground plane coupled to the body and configured to direct the radiation pattern, wherein the ground plane is positioned over at least one of the two propellers such that the at least one propeller is disposed between the ground plane and the body.

2. The UAV as specified in claim 1, wherein the two propellers each have at least two blades each including a respective said antenna.

3. The UAV as specified in claim 2, wherein each said antenna is configured to create a time varying current vector.

4. The UAV as specified in claim 1, wherein the antennas are configured to generate a current that follows along the respective antenna and gets weaker as it reaches to a tip of the respective blade.

5. The UAV as specified in claim 2, wherein a radiating current of each of the blades are lined up to constructively create a radiating mode.

6. The UAV as specified in claim 1, wherein the two propellers are coupled to a magnetic coupling structure configured to create circularly symmetric H fields, which in turn are configured to excite the antennas without physical contact.

7. The UAV as specified in claim 1, wherein the propellers are orthogonal.

8. The UAV as specified in claim 1, wherein the antennas are formed on the respective at least one blade using laser direct structuring (LDS).

9. A method of operating an unmanned aerial vehicle (UAV) comprising a body, two propellers coupled to the body and 90 degrees out of phase with each other, a ground plane positioned over at least one of the two propellers such that the at least one propeller is disposed between the ground plane and the body, wherein the two propellers each include at least one blade including an antenna, the method, comprising:
   the antenna transmitting or receiving radiation; and
   the ground plane reflecting the radiation to create a radiation pattern.

10. The method as specified in claim 9, wherein the two propellers each have at least two blades each including a respective said antenna.

11. The method as specified in claim 10, wherein each said antenna creates a current vector.

12. The method as specified in claim 9, wherein the antennas generate a current that follows along the respective antenna and gets weaker as it reaches to a tip of the respective blade.

13. The method as specified in claim 10, wherein a radiating current of each of the blades are lined up to constructively create a radiating mode.

14. The method as specified in claim 9, wherein the two propellers are coupled to a magnetic coupling structure creating circularly symmetric H fields, which in turn excite the antennas without physical contact.

15. The method as specified in claim 9, wherein the propellers are orthogonal.

16. The method as specified in claim 9, wherein the antennas are formed on the respective at least one blade using laser direct structuring (LDS).

* * * * *